US011255362B2

(12) United States Patent
VanHuis (10) Patent No.: US 11,255,362 B2
(45) Date of Patent: Feb. 22, 2022

(54) MOUNT ASSEMBLY WITH CLIP (71) Applicant: Vibracoustic USA, Inc., South Haven, MI (US)

(72) Inventor: Zachary VanHuis, Woodland, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 0 days.

(21) Appl. No.: 15/995,317

(22) Filed: Jun. 1, 2018

(65) Prior Publication Data

US 2019/0368523 A1 Dec. 5, 2019

(51) Int. Cl.
*F16B 5/06* (2006.01)
*B62D 27/04* (2006.01)
*B62D 24/02* (2006.01)
*F16F 3/093* (2006.01)

(52) U.S. Cl.
CPC .......... *F16B 5/0642* (2013.01); *B62D 27/04* (2013.01); *B62D 24/02* (2013.01); *F16F 3/093* (2013.01)

(58) Field of Classification Search
CPC .............. B60G 2204/41; B60G 13/003; B60G 2204/128; B60G 15/067; B60G 2204/43; B60G 2204/1482; B60G 2204/4302; B60G 2204/4404; B60G 11/28; B60G 15/063; B60G 15/07; B60G 21/0551; B60G 2204/12; B60G 2204/1224; B60G 2204/126; B60G 2204/4305; F16F 9/54; F16F 3/093; B62D 21/11; Y10T 24/42; Y10T 24/44026; Y10T 24/44325; Y10T 24/44376; Y10T 24/44769; Y10T 24/44983; F16B 17/00; F16B 21/086; F16B 2200/20

See application file for complete search history.

(56) References Cited

U.S. PATENT DOCUMENTS

| 2,354,748 A | * | 8/1944 | Franklin | ................. F16B 9/056 439/550 |
| 2,663,895 A | * | 12/1953 | Petri | ..................... H02G 3/083 16/2.1 |
| 3,218,101 A | * | 11/1965 | Adams | .................. F16B 5/0258 296/35.1 |
| 3,243,206 A | * | 3/1966 | Samer | .................. H02G 3/0616 285/154.1 |
| 3,245,703 A | * | 4/1966 | Manly | ................. F16L 37/0847 285/319 |

(Continued)

FOREIGN PATENT DOCUMENTS

JP 2002019440 A * 1/2002
JP 2013015158 A * 1/2013

*Primary Examiner* — Robert A. Siconolfi
*Assistant Examiner* — Mahbubur Rashid
(74) *Attorney, Agent, or Firm* — Fishman Stewart PLLC (57) ABSTRACT

A mount assembly includes a core, an elastomeric member connected to the core, and a clip connected to the elastomeric member. In embodiments, the clip may be configured to connect the mount assembly to a mating component. Embodiments of a clip may include a plurality of support members and a plurality of clip portions. A clip for a mount assembly may include a flange, a base, a plurality of support members extending in an axial direction between the flange and the base, and a plurality of clip portions extending from the base toward and short of the flange.

19 Claims, 13 Drawing Sheets

(56) References Cited

U.S. PATENT DOCUMENTS

| | | | | |
|---|---|---|---|---|
| 3,988,808 A * | 11/1976 | Poe | F16B 21/02 | 24/326 |
| 4,588,218 A * | 5/1986 | Guiler | G09F 3/0311 | 24/16 PB |
| 4,624,585 A * | 11/1986 | Nix | F16C 33/20 | 384/296 |
| 4,656,689 A * | 4/1987 | Dennis | F16L 5/027 | 16/2.2 |
| 4,675,937 A * | 6/1987 | Mitomi | F16B 9/056 | 16/2.1 |
| 4,716,633 A * | 1/1988 | Rizo | B60R 13/0206 | 24/297 |
| 4,720,075 A * | 1/1988 | Peterson | F16F 3/0873 | 248/634 |
| 4,739,543 A * | 4/1988 | Harris, Jr. | B60R 11/00 | 24/297 |
| 4,762,437 A * | 8/1988 | Mitomi | F16B 21/02 | 24/297 |
| 4,768,895 A * | 9/1988 | Ludwig | F16C 11/0614 | 188/321.11 |
| 4,819,954 A * | 4/1989 | Fucci | F16B 5/02 | 277/598 |
| 4,921,203 A * | 5/1990 | Peterson | B60G 99/004 | 248/635 |
| 4,952,106 A * | 8/1990 | Kubogochi | F16B 19/1081 | 411/48 |
| 5,170,985 A * | 12/1992 | Killworth | B60G 99/004 | 248/634 |
| 5,178,433 A * | 1/1993 | Wagner | B60G 99/004 | 296/35.1 |
| 5,255,647 A * | 10/1993 | Kiczek | F02F 7/006 | 123/195 C |
| 5,261,650 A * | 11/1993 | Hein | B60G 15/068 | 267/153 |
| 5,322,466 A * | 6/1994 | Bolli | A63H 33/042 | 24/453 |
| 5,342,139 A * | 8/1994 | Hoffman | B60G 7/001 | 267/219 |
| 5,448,809 A * | 9/1995 | Kraus | F16B 21/02 | 24/453 |
| 5,454,479 A * | 10/1995 | Kraus | F16B 21/088 | 220/787 |
| 5,651,632 A * | 7/1997 | Gordon | F16B 21/06 | 24/662 |
| 5,799,930 A | 9/1998 | Willett | | |
| 5,941,511 A * | 8/1999 | Dawda | F16F 1/3842 | 267/140.12 |
| 5,975,820 A * | 11/1999 | Kirchen | F16B 5/0628 | 411/339 |
| 6,062,763 A * | 5/2000 | Sirois | B62D 24/02 | 248/635 |
| 6,174,118 B1 * | 1/2001 | Rebers | F16B 37/041 | 411/107 |
| 6,398,179 B1 * | 6/2002 | Soles | B60G 11/28 | 248/222.51 |
| 6,435,790 B1 * | 8/2002 | Ichikawa | F16B 5/0642 | 24/453 |
| 6,467,965 B1 * | 10/2002 | Wyer | F16C 33/08 | 384/295 |
| 6,582,171 B2 * | 6/2003 | Bondarowicz | F16B 21/18 | 411/353 |
| 6,623,226 B2 * | 9/2003 | Braun | F16B 5/02 | 411/107 |
| 6,815,615 B1 * | 11/2004 | Haulotte | B60R 16/0222 | 16/2.1 |
| 6,910,671 B1 * | 6/2005 | Norkus | B62D 24/02 | 248/560 |
| 6,971,831 B2 * | 12/2005 | Fattori | F16B 21/082 | 411/508 |
| 7,179,039 B2 * | 2/2007 | Schwartz | F16B 5/0241 | 16/2.1 |
| 7,338,040 B2 * | 3/2008 | Schleck | F16F 9/58 | 267/220 |
| 7,389,977 B1 | 6/2008 | Fernandez et al. | | |
| 7,575,390 B2 * | 8/2009 | Yanagita | F16F 9/0227 | 24/297 |
| 7,785,054 B2 * | 8/2010 | Parisi | B60R 11/00 | 296/35.1 |
| 7,966,702 B2 * | 6/2011 | Horimatsu | F16B 5/0657 | 24/297 |
| 8,186,236 B2 * | 5/2012 | Lorenzen | F16H 25/2454 | 74/89.38 |
| 8,753,055 B2 * | 6/2014 | Ruckel | B60R 21/38 | |
| 8,757,951 B2 * | 6/2014 | Rosemann | F16B 41/002 | |
| 9,303,679 B2 * | 4/2016 | Dechant | F16B 41/00 | |
| 9,423,062 B2 * | 8/2016 | Steele | F16L 37/0982 | |
| 9,518,628 B2 * | 12/2016 | Yahata | F16F 1/3842 | |
| 9,534,627 B2 * | 1/2017 | Weber | F16B 21/075 | |
| 9,664,225 B2 * | 5/2017 | Szczukowski | F16B 41/002 | |
| 10,150,444 B1 * | 12/2018 | Schwalm | B60R 21/38 | |
| 2004/0022600 A1 * | 2/2004 | Kovac | F16B 19/02 | 411/353 |
| 2004/0091334 A1 * | 5/2004 | Hoshi | F16B 19/1081 | 411/508 |
| 2004/0163218 A1 * | 8/2004 | Yuta | F16B 37/0842 | 24/297 |
| 2004/0213645 A1 * | 10/2004 | Kovac | F16B 5/0258 | 411/512 |
| 2006/0072965 A1 * | 4/2006 | Yanagita | F16F 9/0227 | 403/220 |
| 2006/0082037 A1 * | 4/2006 | Al-Dahhan | B60G 11/15 | 267/179 |
| 2006/0093429 A1 * | 5/2006 | Trotter | F16B 12/26 | 403/165 |
| 2007/0113392 A1 * | 5/2007 | Brokholc | B60G 15/068 | 29/464 |
| 2008/0075403 A1 * | 3/2008 | Holt | F02M 55/025 | 384/551 |
| 2009/0022566 A1 * | 1/2009 | Chretien | F16B 43/00 | 411/353 |
| 2009/0045562 A1 * | 2/2009 | Reisel | F16F 1/128 | 267/249 |
| 2009/0252573 A1 * | 10/2009 | Nakazato | F16B 21/086 | 411/510 |
| 2012/0049425 A1 * | 3/2012 | Willis | H05K 7/142 | 267/141 |
| 2012/0170969 A1 * | 7/2012 | Forthaus | F16C 11/069 | 403/50 |
| 2014/0312545 A1 * | 10/2014 | Ahmed | F16H 25/2454 | 74/89.38 |
| 2015/0323031 A1 * | 11/2015 | Yahata | F16F 1/3863 | 267/141.2 |
| 2016/0355196 A1 * | 12/2016 | Johansson | F16C 33/7813 | |
| 2017/0114935 A1 * | 4/2017 | Kujawski, Jr | B25B 27/0028 | |

\* cited by examiner

MOUNT ASSEMBLY WITH CLIP

TECHNICAL FIELD

The present disclosure generally relates to mounts and mount assemblies, including body mounts and top mounts that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some mount assembly designs, mount assemblies are configured for connection with mating components via separate fasteners, such as nuts and bolts that may involve additional assembly operations and tools.

There is a desire for solutions/options that minimize or eliminate one or more challenges or shortcomings of mount assemblies. The foregoing discussion is intended only to illustrate examples of the present field and should not be taken as a disavowal of scope.

SUMMARY

With embodiments, a mount assembly may include a core, an elastomeric member connected to the core, and/or a clip connected to the elastomeric member and configured to connect the mount assembly to a mating component. The clip may include a plurality of support members and a plurality of clip portions.

In embodiments, a clip for a mount assembly may include a flange, a base, a plurality of support members extending in an axial direction between the flange and the base, and/or a plurality of clip portions extending from the base toward and short of the flange.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1-4, a mount assembly 10 may include a core 12, an elastomeric member 14, and/or a clip 16. The clip 16 may be configured to connect the mount assembly 10 with a mating component 20, such as a first vehicle component or structure. The core 12 may include one or more of a variety of configurations and/or may be configured to connect the mount assembly 10 to another component, such as a second vehicle component or structure. The core 12 may include, for example and without limitation, a cylindrical configuration that may be hollow or may include hollow portions. A ferrule 18 may be connected to the core 12 and/or provided at or about an end of the core 12.

With embodiments, such as generally illustrated in FIGS. 1-5, an elastomeric member 14 may be connected to (e.g., formed around) the core 12. For example and without limitation, the elastomeric member 14 may be disposed (e.g., formed) partially or entirely around the core 12 and/or along part or substantially all of a length of the core 12. An elastomeric member 14 may include one or more of a variety of shapes, sizes, configurations, and/or materials. For example and without limitation, an elastomeric member 14 may include a generally cylindrical configuration and may include a first portion 30 (e.g., a top portion) and/or a second portion 32 (e.g., a bottom portion). The first portion 30 may include an outer diameter 30D that may be greater than an outer diameter 32D of the second portion 32. The first portion 30 may be configured to be disposed on or at a first side 24 of a mating component 20 and the second portion 32 may be configured to be disposed in the mating component 20 and/or on or at a second side 26 of the mating component 20. An elastomeric member 14 may include one or more elastomeric and/or damping materials, such as, for example and without limitation, a rubber material (e.g., an injection molded rubber).

In embodiments, such as generally illustrated in FIGS. 1, 2, 3, 4, 6A, 6B, 6C, 6D, 6E, 6F, and 6G, a clip 16 may include one or more of a variety of shapes, sizes, configurations, and/or materials. For example and without limitation, a clip 16 may include or be comprised of a plastic (e.g., injection molded nylon), a polymer, metal, aluminum, and/or steel, among other materials. A clip 16 may be formed, for example, via additive manufacturing, which may include three-dimensional (3D) printing. A clip 16 may be configured for connecting a mount assembly 10 with a mating component, such as the mating component 20.

With embodiments, a clip 16 may include a flange 40, a base 42, one or more support members 44, and/or one or more clip portions 46. The flange 40 may be generally annular and may extend radially outward (e.g., relative to an axial direction). The flange may include a curved portion or segment. The flange 40 may include an outer diameter 40D and/or may be the portion of the clip 16 and/or the mount assembly 10 with the largest diameter (see, e.g., FIG. 6A). The outer diameter 40D of the flange 40 may be greater than an outer diameter 30D of the first portion 30 of the elastomeric member 14. The flange 40 may include an outer edge 50 that may be rounded. A first side 52 (e.g., a top side) of the flange 40 may be configured to abut the first portion 30 of the elastomeric member 14 and/or a second side 54 (e.g., a bottom side) of the flange 40 may be configured to abut a first side 24 of the mating component 20.

In embodiments, a base 42 of a clip 16 may include, for example and without limitation, a generally annular configuration (see, e.g., FIGS. 6B-6G). An outer diameter 42D of the base 42 may be smaller than the outer diameter 40D of the flange 40. The base 42 may be connected to the flange 40 via one or more support members 44.

With embodiments, support members 44 may extend (e.g., in an axial direction) between the flange 40 and the base 42. The flange 40, the base 42, and the support members 44 may be provided in an L-shaped configuration. Support members 44 may include one or more of a variety of shapes, sizes, and/or configurations. For example and without limitation, support members 44 may include generally rectangular configurations, parallelogram configurations, and/or other configurations. One or more support members 44 of a clip 16 may include a different configuration than at least one other support member 44 of the clip 16. For example and without limitation, a first support member $44_1$ may include a rectangular configuration that may extend generally in a radial direction, a second support member $44_2$ may include an angled parallelogram configuration that may taper in a circumferential direction (e.g., such that the radial thickness $44_R$ of the second support member $44_2$ varies in a circumferential direction), and/or a third support member $44_3$ may include an angled parallelogram configuration that may taper (e.g., to a greater degree than the second support member $44_2$) in the circumferential direction (see, e.g., FIGS. 6B and 6F). As used herein, the term taper may mean to extend (or have a portion that extends) at an angle or an angled direction. The second support member $44_2$ and/or the third support member $44_3$ may include a circumferential extent $44C_2$, $44C_3$ that may be greater than a circumferential extent $44C_1$ of the first support member $44_1$. A circumferential extent $44C_3$ of the third support member $44_3$ may be greater than the circumferential extent $44C_2$ the second support member $44_2$. A clip 16 may include a fourth support member $44_4$ and/or a fifth support member $44_5$. The fourth support member $44_4$ may be a mirrored version (e.g., relative to a top/bottom direction of FIG. 6F) of the third support member $44_3$ and/or the fifth support member $44_5$ may be a mirrored version of the second support member $44_2$. A clip may include a sixth support member $44_6$, a seventh support member $44_7$, an eighth support member $44_8$, a ninth support member $44_9$, and/or a tenth support member $44_{10}$. The sixth support member $44_6$, seventh support member $44_7$, eighth support member $44_8$, ninth support member $44_9$, and a tenth support member $44_{10}$ may be mirrored versions (e.g., relative to a left/right direction of FIG. 6F) of the fifth support member $44_5$, fourth support member $44_4$, third support member $44_3$, second support member $44_2$, and first support member $44_1$, respectively.

With embodiments, a clip 16 may include support members 44 of multiple different configurations (e.g., the first support member $44_1$, the second support member $44_2$, the third support member $44_3$, the fourth support member $44_4$, and/or the fifth support member $44_5$ may include different configurations). A clip 16 may include, for example and without limitation, ten support members 44 and/or may include a greater or lesser number of support members 44.

Figure 1:
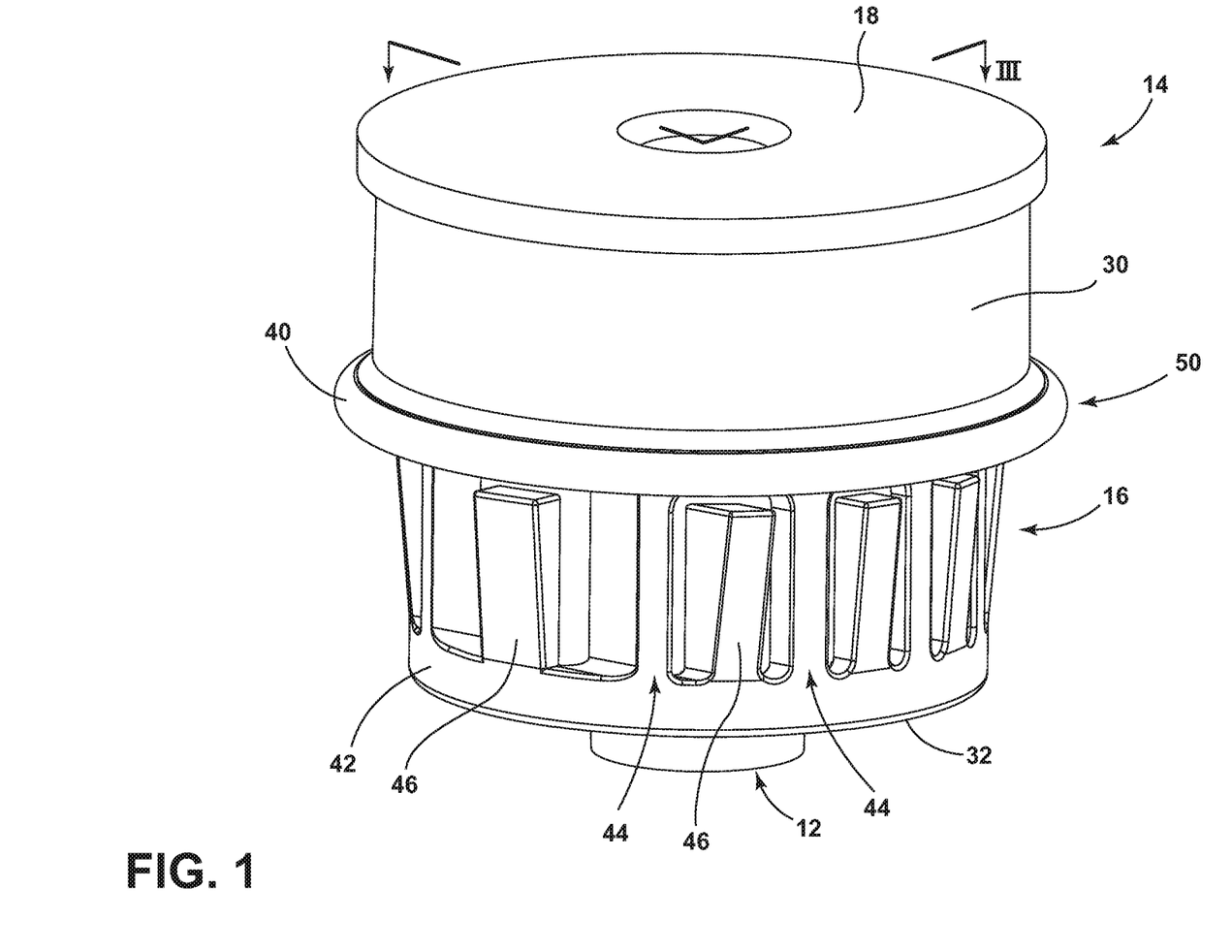
FIG. 1 is a perspective view generally illustrating an embodiment of a mount assembly according to teachings of the present disclosure.
Figure 2:
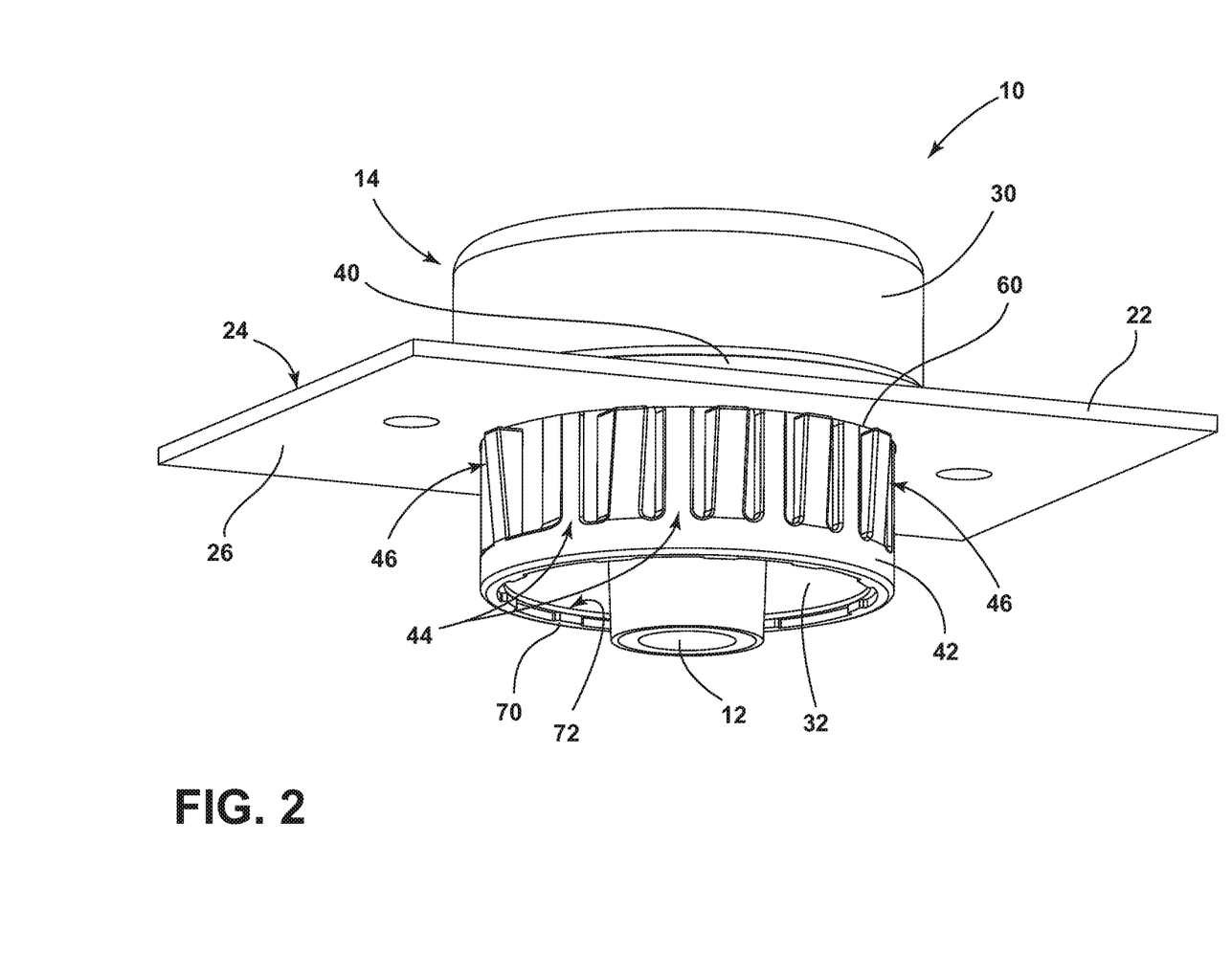
FIG. 2 is a perspective view generally illustrating an embodiment of a mount assembly and a mating component according to teachings of the present disclosure.
Figure 3:
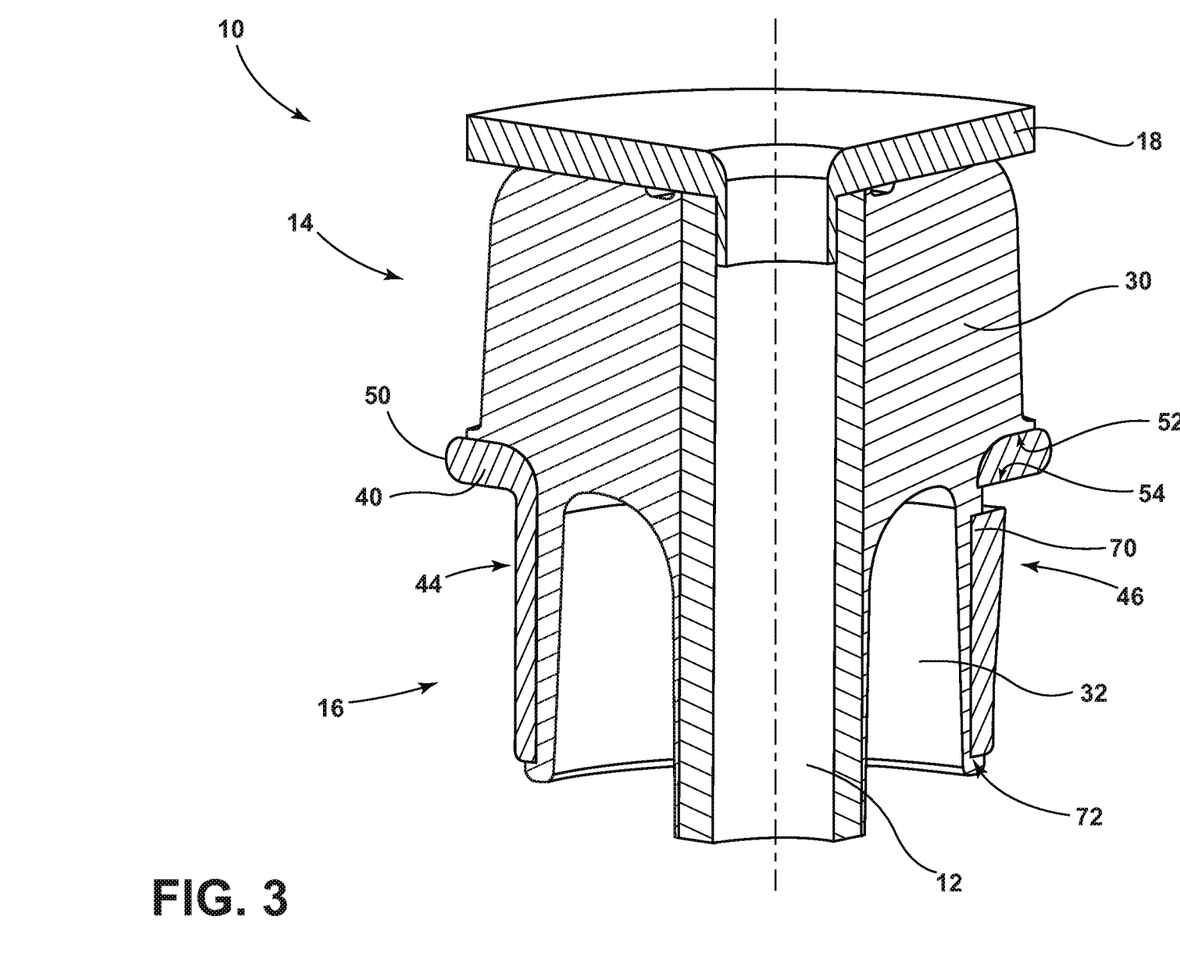
FIG. 3 is a cross-sectional perspective view generally illustrating portions of an embodiment of a mount assembly according to teachings of the present disclosure.
Figure 4:
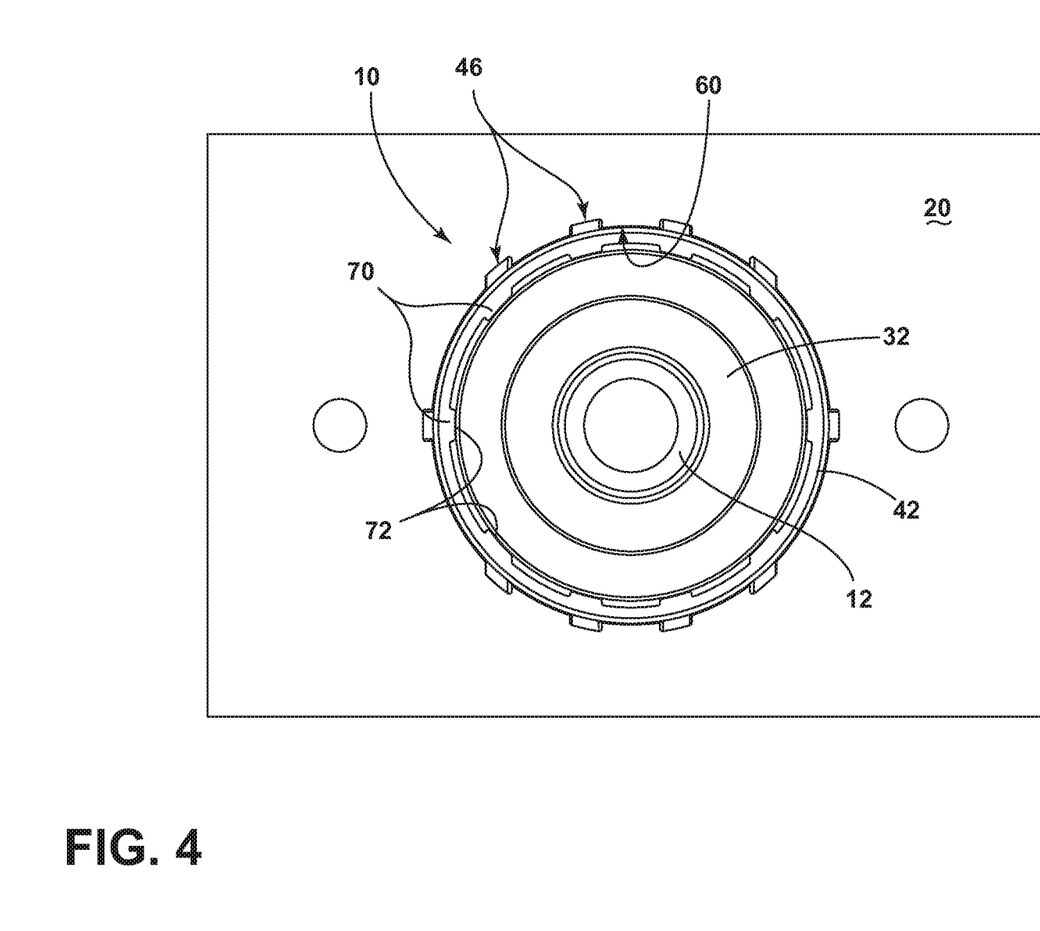
FIG. 4 is a bottom view generally illustrating portions of an embodiment of a mount assembly and a mating component according to teachings of the present disclosure.
Figure 5:
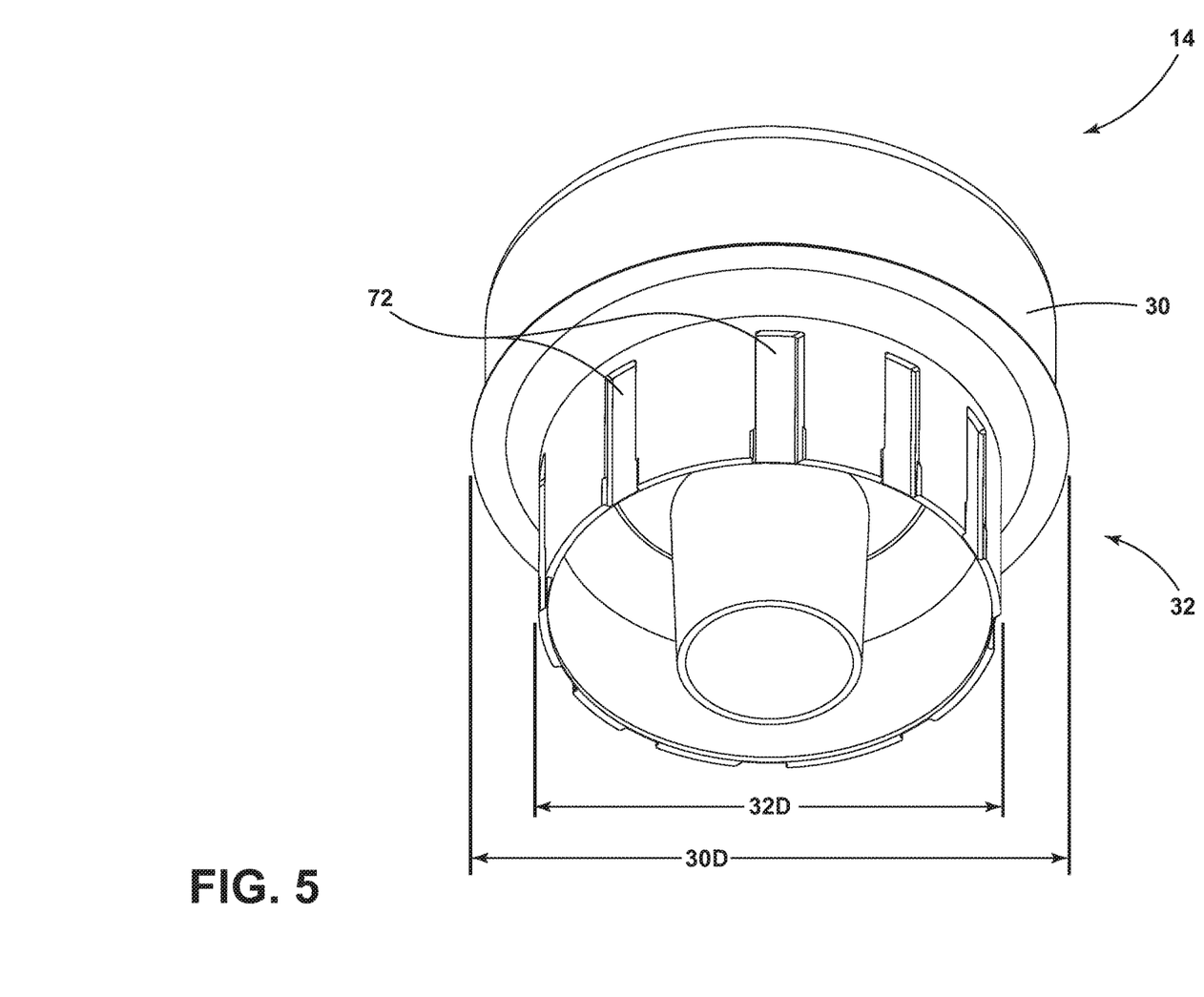
FIG. 5 is a perspective view generally illustrating an embodiment of an elastomeric component according to teachings of the present disclosure.
Figure 5A:
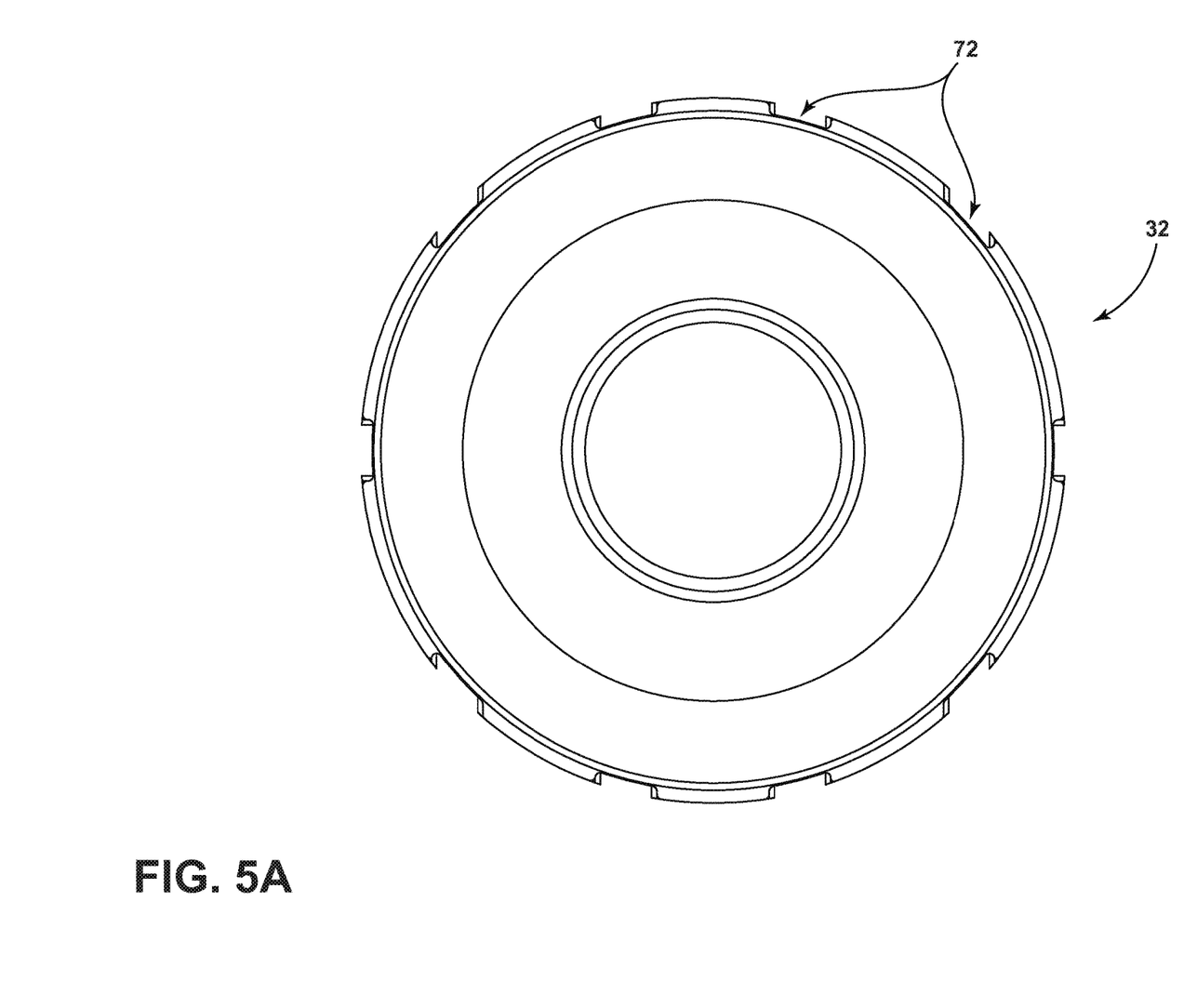
FIG. 5A is a bottom view generally illustrating a bottom portion of an embodiment of an elastomeric component, with a top portion hidden, according to teachings of the present disclosure.
Figure 6A:
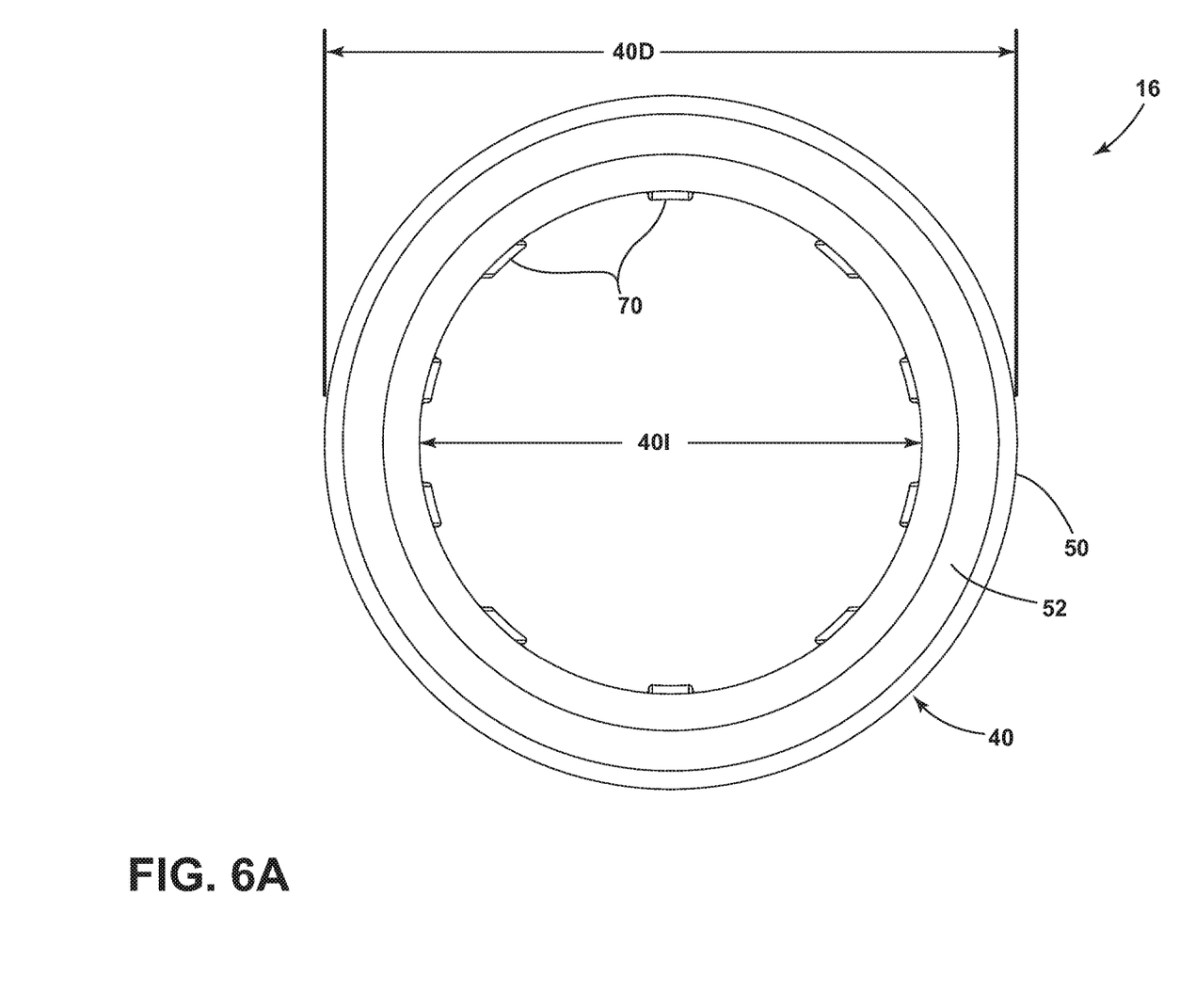
FIG. 6A is a top view generally illustrating portions of an embodiment of a clip according to teachings of the present disclosure.
Figure 6B:
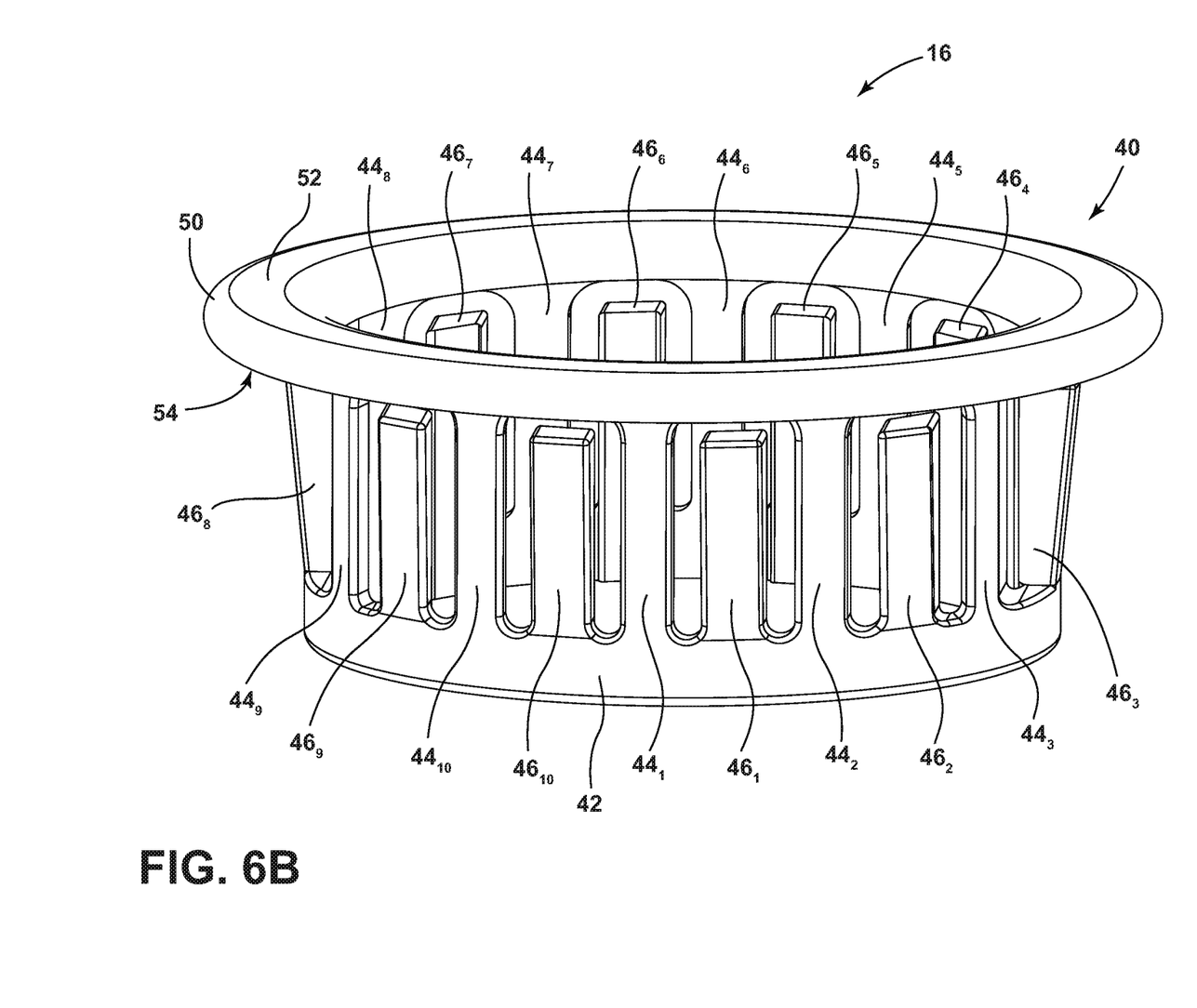
FIGS. 6B, 6C, and 6D are perspective views generally illustrating portions of embodiments of clips according to teachings of the present disclosure.
Figure 6C:
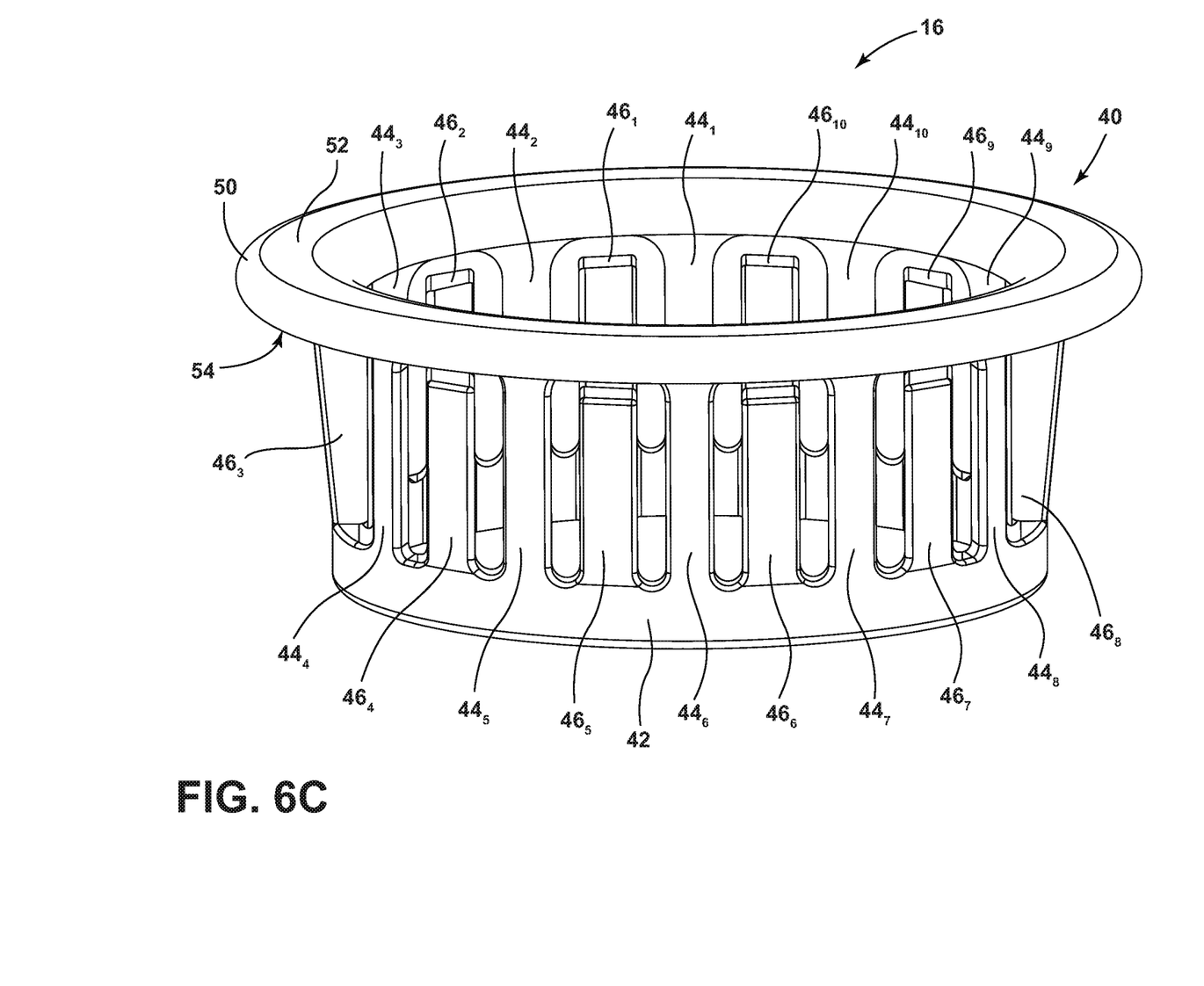
Figure 6D:
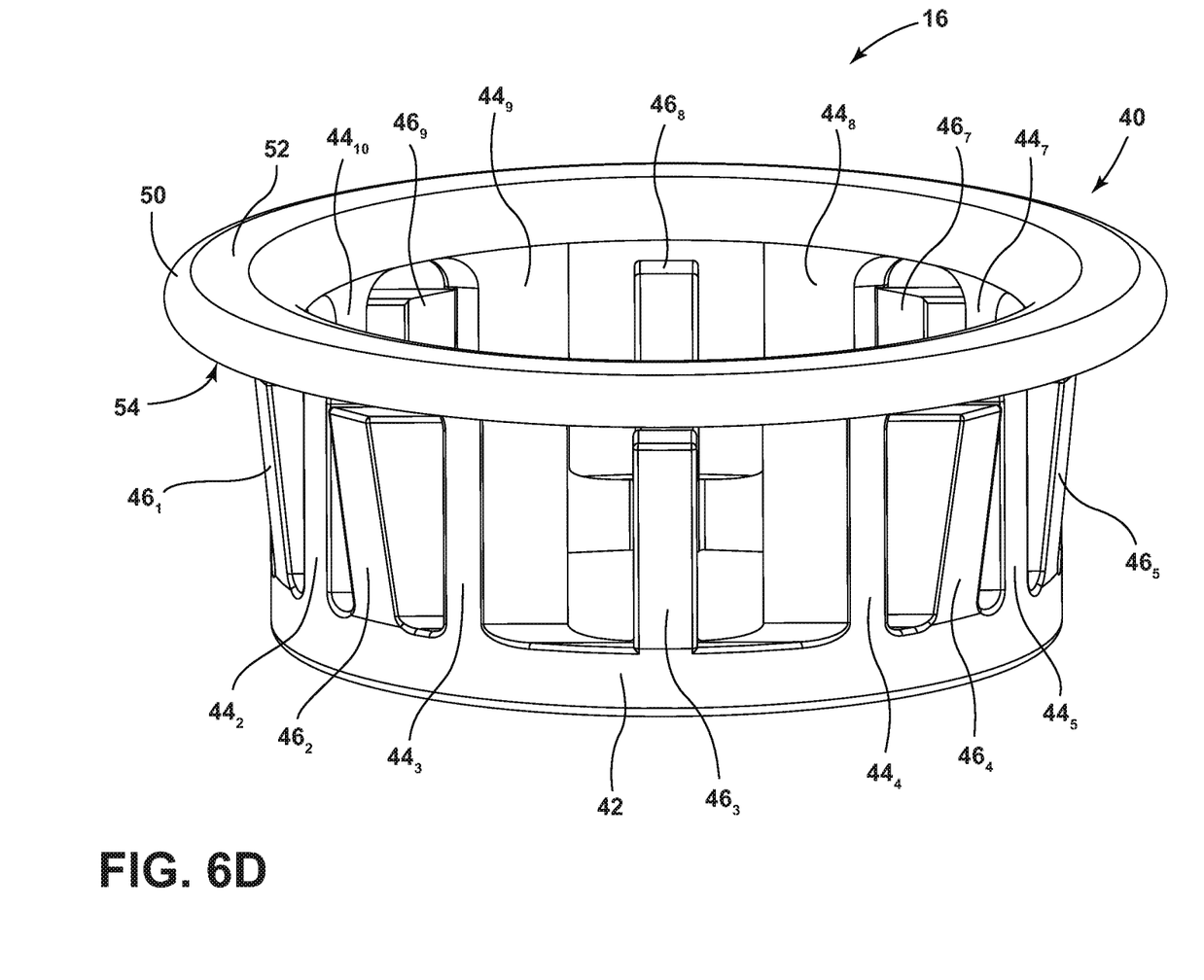
Figure 6E:
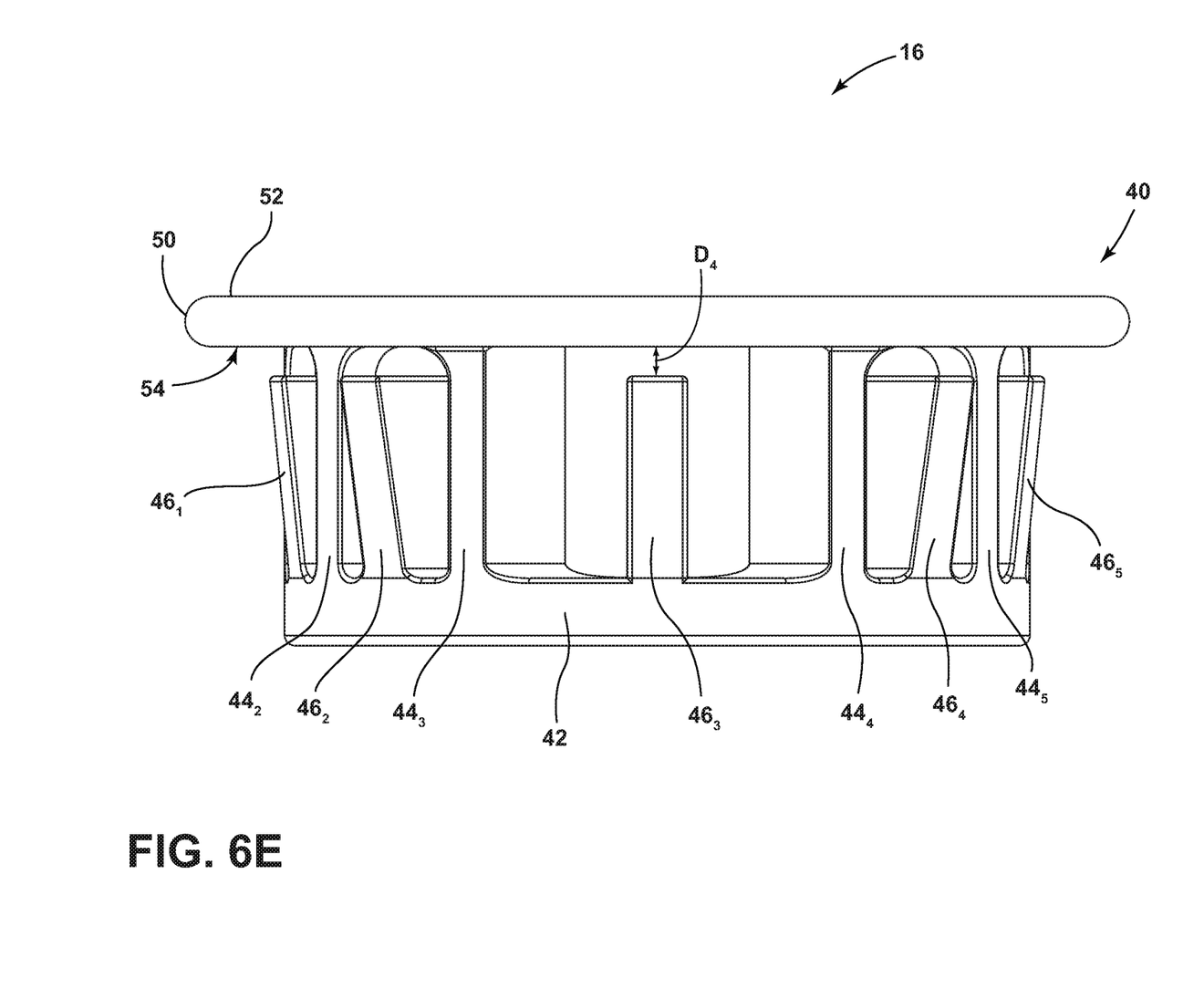
FIG. 6E is a side view generally illustrating portions of an embodiment of a clip according to teachings of the present disclosure.
Figure 6F:
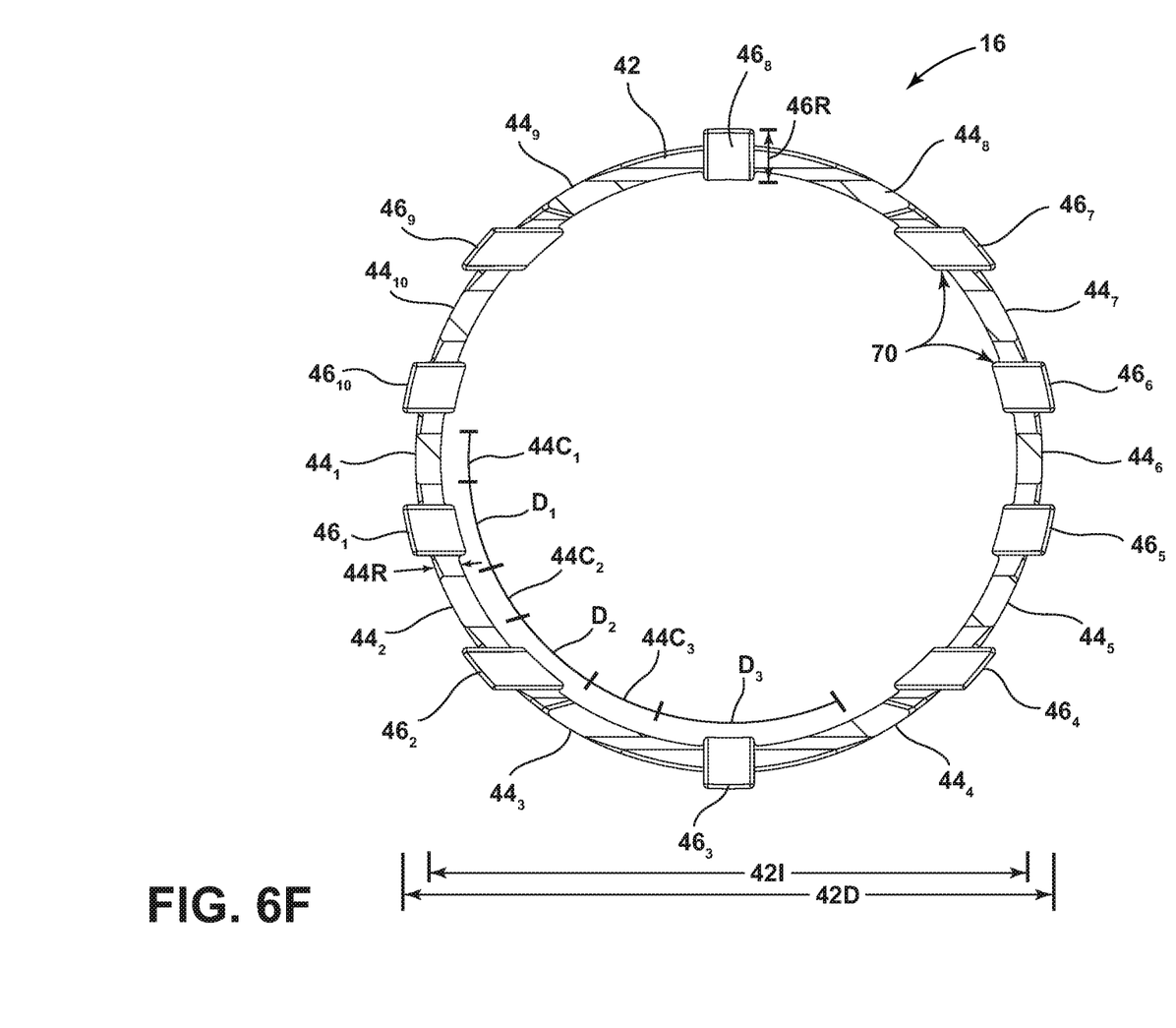
FIG. 6F is a cross-sectional view generally illustrating portions of an embodiment of a clip according to teachings of the present disclosure.

In embodiments, such as generally illustrated in FIG. 6F, support members 44 of a clip 16 may or may not be equally spaced from each other (e.g., about the flange and/or the base). For example and without limitation, the first support member $44_1$ may be spaced from the second support member $44_2$ by a first distance $D_1$ (e.g., a circumferential distance), the second support member $44_2$ may be spaced from the third support member $44_3$ by a second distance D2, and/or the third support member $44_3$ may be spaced from the fourth support member $44_4$ by a third distance $D_3$. The third distance D3 may be greater (e.g., about 5, 10, or 20% or more greater) than the second distance $D_2$, which may be greater than the first distance $D_1$ (e.g., about 5, 10, or 20% or more greater).

With embodiments, such as generally illustrated in FIGS. 1-4 and 6B-6G, a clip 16 may include one or more clip portions 46. Clip portions 46 may be configured for connecting a mount assembly 10 with a mating component 20 (e.g., without tools and/or separate fasteners). Clip portions 46 may include one or more of a variety of shapes, sizes, and/or configurations. For example and without limitation, a clip 16 may include clip portions 46 of a first configuration, a second configuration, a third configuration, a fourth configuration, and/or a fifth configuration. A first configuration may include a generally rectangular configuration that may extend generally in a radial direction. A second configuration and a third configuration may include angled parallelogram configurations that may be angled/tapered in opposite directions (e.g., opposite circumferential directions, such that the radial thicknesses 46R vary in a circumferential direction). The second configuration and the third configuration may be mirrored versions of each other. A fourth configuration and a fifth configuration may include angled parallelogram configurations that may be angled in opposite directions to a greater degree than the second configuration and the third configuration. The fourth configuration and the fifth configuration may be mirrored versions of each other. A clip 16 may include a first clip portion $46_1$ and a sixth clip portion $46_6$ that may include the first configuration, a second clip portion $46_2$ and a seventh clip portion $46_7$ that may include the second configuration, a third clip portion $46_3$ and an eighth clip portion $46_8$ that may include the third configuration, a fourth clip portion $46_4$ and a ninth clip portion $46_9$ that may include the fourth configuration, and/or a fifth clip $46_5$ portion and a tenth clip portion $46_{10}$ that may include the fifth configuration (see, e.g., FIG. 6F).

With embodiments, clip portions 46 may extend (e.g., in an axial direction) from the base 42 toward the flange 40. Clip portions 46 may extend short of the flange 40 by a distance $D_4$ (see, e.g., FIG. 6E). The distance $D_4$ may correspond to a size (e.g., a thickness) of the mating component 20. For example and without limitation, clip portions 46 may be configured such that a mating component (e.g., a mating component 20) may fit between tops of the clip portions 46 and the second side 54 of the flange 40.

In embodiments, such as generally illustrated in FIGS. 6B-6D, one or more of the clip portions 46 may include tapered configurations. For example and without limitation, radial extents or thicknesses 46R of clip portions 46 may vary in an axial direction (e.g., increase from the base 42 toward the flange 40 such that the thickest section of a clip portion 46 may be disposed closest to the flange 40 and the thinnest section of a clip portion 46 may be disposed at or about the base 42). Clip portions 46 may be disposed such that at least portions of the clip portions 46 may be disposed radially outward of an outer diameter 42D of the base 42 (see, e.g., FIGS. 4, 6F, and 6G).

With embodiments, clip portions 46 may be configured to flex, such as in radial directions. For example and without limitation, a base 42 of a clip 46 may be inserted into a corresponding aperture or recess 60 in a mating component 20 (see, e.g., FIGS. 2 and 4). As the clip 16 is inserted, clip portions 46 may contact the mating component 20, which may cause the clip portions 46 to deflect radially inward. Once insertion is complete, such as when the mating component 20 is disposed between tops of the clip portions 46 and the second side 54 of the flange 40, the clip portions 46 may deflect radially outward toward initial positions of the clip portions 46, which may secure/lock the mount assembly 10 relative to the mating component 20 (e.g., the clip 16 may snap into the mating component 20).

In embodiments, such as generally illustrated in FIGS. 6B-6F, support members 44 and clip portions 46 of a clip 16 may be disposed in an alternating configuration such that one or each support member 44 is disposed between (e.g., circumferentially) a respective two clip portions 46 and/or such that one or each clip portion 46 is disposed between a respective two support members 44.

Figure 6G:
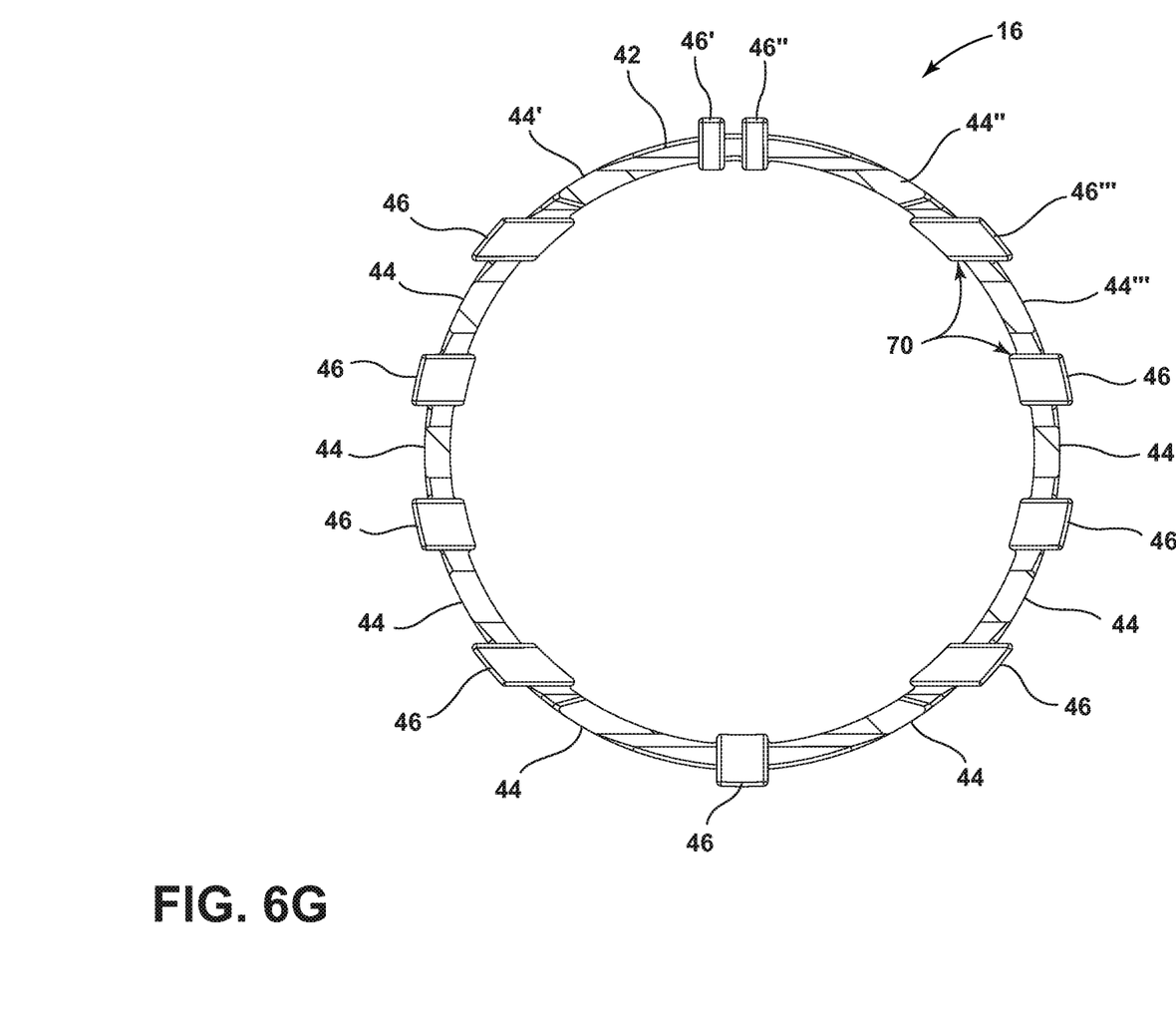
FIG. 6G is a cross-sectional view generally illustrating portions of an embodiment of a clip according to teachings of the present disclosure.

With embodiments, a clip 16 may include a first pair of adjacent support members 44 (e.g., a support member 44 and the next support member 44 in a circumferential direction) and a second pair of adjacent support members 44. In embodiments, such as generally illustrated in FIG. 6G, a different number of clip portions 46 may be disposed between the first pair of adjacent support members 44 than between the second pair of support members 44. For example and without limitation, two clip portions 46', 46" may be disposed between the first pair of adjacent support members 44', 44" and one clip portion 46''' may be disposed between the second pair of adjacent support members 46", 46'''.

With embodiments, such as generally illustrated in FIGS. 2-4, 6A, 6F, and 6G, a clip 16 may include one or more protrusions 70 that may be configured to engage an elastomeric member 14 and/or to connect a clip 16 with an elastomeric member 14. Protrusions 70 may extend radially inward to engage corresponding recesses 72 in the elastomeric member 14 (see, e.g., FIGS. 2-5A). The corresponding recesses 72 may be circumferentially spaced about the second portion 32 of the elastomeric member 14, may extend in an axial direction, and/or may extend to a bottom edge of the second portion 32. Protrusions 70 may be aligned with and/or integrated with clip portions 46. For example and without limitation, some or all clip portions 46 may include a corresponding protrusion 70 that may include a complementary configuration as the clip portion 46 (e.g., may be configured as an inward extension of the clip portion 46). Recesses 72 of the elastomeric member 14 may be angled to correspond with angles of the protrusions 70, which may correspond to angles of the clip portions 46 from which the protrusions 70 may extend. Protrusions 70 may be disposed such that at least portions of protrusions 70 may be disposed radially inward of an inner diameter 401 of the flange 40 (see, e.g., FIG. 6A) and/or radially inward of an inner diameter 421 of the base 42 (see, e.g., FIGS. 6F and 6G).

With embodiments, a method of connecting a mount assembly 10 to a mating component (e.g., mating component 20) may include providing a mount assembly 10. Providing the mount assembly 10 may include providing a core 12, an elastomeric member 14, and/or a clip 16. The elastomeric member 14 may be connected to (e.g., formed around) the core 12. The clip 16 may be connected to the elastomeric member 14. Connecting the clip 16 to the elastomeric member 14 may include inserting protrusions 70 of the clip 16 into corresponding recesses 72 of the elastomeric member 14. The clip 16 may be inserted from the bottom of the elastomeric member 14 (e.g., in an axial direction) until a flange 40 of the clip 16 contacts and/or abuts a first/top portion 30 of the elastomeric member 14. An assembled mount assembly 10 may be inserted at least partially into an aperture or recess 60 of a mating component (e.g., mating component 20). Inserting the mount assembly 10 into the aperture or recess 60 may include clip portions 46 of the clip 16 deflecting radially inward, which may cause at least some deformation of elastomeric member 14. The mount assembly 10 may continue to be inserted until the mating component 20 is disposed between tops of the clip portions 46 and the flange 40. The clip portions 46 may then deflect back outwardly, which may latch or secure the mount assembly 10 relative to the mating component 20. The method may not involve any tools or other fasteners, such as bolts, screws, or the like.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments. For example and without limitation, the number of clip portions, the widths/circumferential extents of the clip portions, the thicknesses/radial extents of the clip portions, the tapering of the clip portions, the diameter of the base, and/or the diameter of the flange may be modified, such as to cooperate with configurations of the second mating component.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A mount assembly, comprising:
   a core;
   an elastomeric member connected to the core; and
   a clip connected to and in contact with the elastomeric member and configured to connect the mount assembly to a mating component;
   wherein the clip includes:
      a radially-extending flange;
      a base;
      a plurality of support members extending in an axial direction between the flange and the base, wherein the plurality of support members are circumferentially separated from each other; and
      a plurality of clip portions extending from the base toward and short of the flange;
   wherein the elastomeric member comprises rubber.

2. The mount assembly of claim 1, wherein an outer diameter of the flange is greater than an outer diameter of the elastomeric member;
   the core is cylindrical and includes one or more hollow portions;
   the elastomeric member is in contact with an inner radial surface of the clip and an outer radial surface of the core;
   the core comprises metal; and
   the elastomeric member is formed around the core.

3. The mount assembly of claim 1, wherein the clip includes an L-shaped cross-section;
   the plurality of clip portions and the plurality of support members are disposed substantially perpendicular to the flange;
   the plurality of support members are circumferentially separated from each other by respective apertures; and
   the plurality of clip portions are circumferentially separated from each other and disposed at least partially in the respective apertures.

4. The mount assembly of claim 1, wherein the plurality of support members are connected to and in contact with the flange and the base; and
   a radial thickness of the at least one of the plurality of support members varies in a circumferential direction.

5. The mount assembly of claim 1, including a ferrule connected to the core and axially spaced from the flange;
   wherein the plurality of clip portions extend from the base toward the flange;
   the elastomeric member is disposed at least partially around the core;
   the elastomeric member is disposed partially radially within the clip and partially between the flange and the ferrule in the axial direction; and
   at least one clip portion of the plurality of clip portions is disposed radially outward of an outer diameter of the base.

6. The mount assembly of claim 5, wherein one or more of the clip portions of the plurality of clip portions are angled or tapered such that radial thicknesses of the one or more clip portions increase toward the flange and vary in a circumferential direction.

7. The mount assembly of claim 1, wherein at least one of the plurality of clip portions includes an integrated protrusion extending radially inward to engage an axially-extending recess of the elastomeric member.

8. The mount assembly of claim 7, wherein the axially-extending recess extends in the axial direction from a bottom edge of the elastomeric member; and
   the axially-extending recess is substantially rectangular.

9. The mount assembly of claim 1, wherein the mating component is substantially planar;
   the plurality of clip portions are disposed at a distance from the flange;
   the distance corresponds to a thickness of the mating component; and
   the clip is configured to connect the mount assembly to the mating component without separate fasteners.

10. A clip for a mount assembly, the clip comprising:
    a radially-extending flange;
    a base;
    a plurality of support members extending in an axial direction between the flange and the base, wherein the plurality of support members are circumferentially separated from each other;
    a plurality of clip portions extending from the base toward and short of the flange; and
    a plurality of inwardly extending protrusions each extending from a respective clip portion of the plurality of clip portions and configured to engage respective axially-extending recesses of an elastomeric member;

wherein at least one of the plurality of clip portions includes a parallelogram configuration, when viewed in the axial direction, having at least one oblique angle, and the plurality of clip portions extend radially outward beyond an outer diameter of the base to engage a mating component.

11. The clip of claim 10, wherein the flange, the base, and the plurality of support members are disposed in an L-shaped configuration such that the plurality of support members are substantially perpendicular to the base.

12. The clip of claim 10, wherein the plurality of clip portions extend short of the flange by a distance corresponding to a thickness of a substantially planar mating component.

13. The clip of claim 10, wherein the plurality of clip portions includes at least eight clip portions; and
the plurality of support members includes at least eight support members.

14. The clip of claim 10, wherein the plurality of clip portions include five different configurations.

15. The clip of claim 10, wherein the clip portions are angled or tapered such that a radial thickness of the clip portions is smallest proximate the base and largest proximate the flange; and
at least one of plurality of the support members has a radial thickness that varies in a circumferential direction.

16. The clip of claim 10, wherein a first inwardly extending protrusion of the plurality of inwardly extending protrusions that extends from a first clip portion of the plurality of clip portions is angled at a protrusion angle corresponding to a clip portion angle at which the first clip portion is angled.

17. The clip of claim 10, wherein the plurality of clip portions includes a first clip portion and a second clip portion, and the first clip portion and the second clip portions are angled or tapered in different circumferential directions; and
a radial thickness of the at least one of the plurality of support members varies in a circumferential direction.

18. The clip of claim 10, wherein the plurality of support members include a first pair of circumferentially adjacent support members and a second pair of circumferentially adjacent support members, and a different number of clip portions of the plurality of clip portions are disposed between the first pair of circumferentially adjacent support members than between the second pair of circumferentially adjacent support members.

19. A clip for a mount assembly, the clip comprising:
a radially-extending flange;
a base;
a plurality of support members extending in an axial direction between the flange and the base, wherein the plurality of support members are circumferentially separated from each other;
a plurality of clip portions extending from the base toward and short of the flange; and
a plurality of inwardly extending protrusions each extending from a respective clip portion of the plurality of clip portions and configured to engage respective axially-extending recesses of an elastomeric member;
wherein at least one of the plurality of clip portions includes a parallelogram configuration, when viewed in the axial direction, having at least one oblique angle; at least one clip portion of the plurality of clip portions is angled or tapered in a circumferential direction such that a radial thickness of the at least one clip portion varies in the circumferential direction; and a first support member and a second support member of the plurality of support members include different circumferential extents.

* * * * *